No. 642,030. Patented Jan. 23, 1900.
W. C. WILLEY.
SEED PLANTER.
(Application filed Nov. 16, 1899.)
(No Model.)
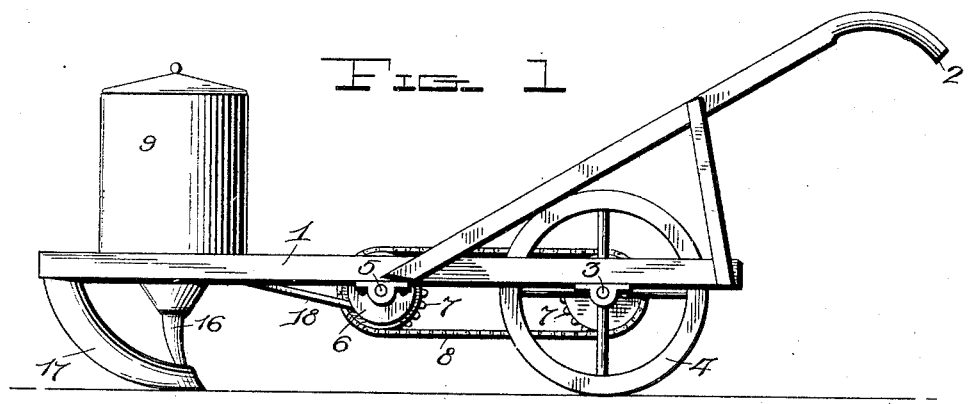
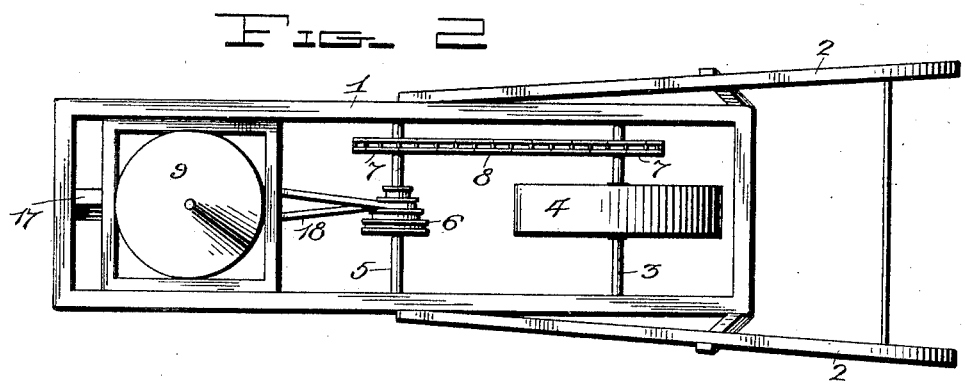
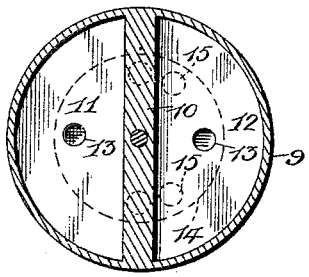
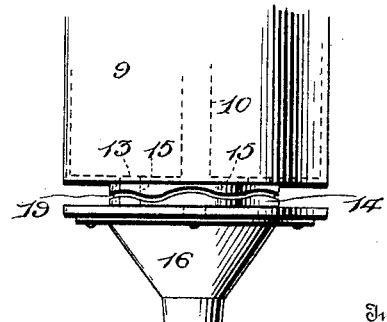
Witnesses
Inventor
W. C. Willey,
by H. B. Willson & Co.,
Attorneys

UNITED STATES PATENT OFFICE.

WILLIS C. WILLEY, OF CLINTON, KENTUCKY.

SEED-PLANTER.

SPECIFICATION forming part of Letters Patent No. 642,030, dated January 23, 1900.

Application filed November 16, 1899. Serial No. 737,208. (No model.)

*To all whom it may concern:*

Be it known that I, WILLIS C. WILLEY, a citizen of the United States, residing at Clinton, in the county of Hickman and State of Kentucky, have invented certain new and useful Improvements in Seed-Planters; and I do declare the following to be a full, clear, and exact description of the invention, such as will enable others skilled in the art to which it appertains to make and use the same.

The invention relates to seed-planters.

The object of the invention is to provide a seed-planter by means of which two kinds of seed may be planted at the same time in alternate holes.

To this end the invention consists in certain features of construction and combination of parts, which will be hereinafter fully described and claimed.

In the accompanying drawings, Figure 1 is a side elevation of my improved seed-planter. Fig. 2 is a top plan view. Fig. 3 is a cross-sectional view through the seed-hopper looking downward. Fig. 4 is an edge view of the seed-dropping disk.

In the drawings the same reference characters indicate the same parts of the invention.

1 denotes the frame of the seed-planter, which is preferably rectangular in form and may be made of any material.

2 denotes the handles of the frame, and 3 the drive-shaft, journaled in the side pieces of the frame and provided with a fixed drive-wheel 4.

5 denotes a counter-shaft, provided with a variable cone-gearing 6. The counter-shaft and drive-shaft are each provided with sprocket-wheels 7, connected by a sprocket-chain 8.

9 denotes the seed-hopper, provided with a partition 10 to divide the hopper into compartments 11 and 12, one adapted to contain seed of one characters and the other seed of another character. The bottom of this hopper is provided with two seed-discharge openings 13, one on each side of the partition. 14 denotes the seed-dropper disk, which is journaled in said bottom and is provided with three seed-discharge openings or cups 15, so arranged that while one of the cups or openings is discharging its seed through one opening in the bottom of the hopper the other cups or openings will be in such position as not to register with the other opening in the bottom of the hopper, so that the seed from the different compartments of the hopper will be discharged alternately. A spout 16 extends from the bottom of the hopper immediately at the rear of the furrow-opener 17.

18 denotes a cord or belt extending from the variable cone-gearing to and engaging a serpentine groove 19, formed in the periphery of the disk, whereby said disk will be rotated.

While I have shown the disk provided with three openings, it is evident that any odd number of openings may be formed in the disk, so that they be arranged to discharge the seed alternately from the two compartments of the hopper.

From the foregoing description, taken in connection with the accompanying drawings, the construction, operation, and advantages of my seed-planter will be readily apparent without requiring an extended explanation.

It will be seen that the device is simple of construction, that said construction permits of its manufacture at a small cost, and that it is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

In a seed-planter, the combination with the main frame provided with a furrow-opener; of a drive-shaft journaled in said frame, a supporting-wheel fixed to said drive-shaft, a counter-shaft journaled in said frame and geared with said drive-shaft, a seedbox formed with two compartments having discharge-apertures, a seed-dropper disk journaled to the bottom of said compartments and provided with an odd number of holes or seed-cups to alternately discharge the seed from the two compartments, said disk being provided in its periphery with a serpentine groove, a pulley upon the counter-shaft, and a belt or cord engaging the serpentine groove and the pulley, substantially as and for the purpose set forth.

In testimony whereof I have hereunto set my hand in presence of two subscribing witnesses.

WILLIS C. WILLEY.

Witnesses:
JOHN L. WILLIAMS,
WEB. C. PORTER.